Nov. 9, 1937.  P. S. HARPER  2,098,659
GAS BURNER
Filed July 2, 1936
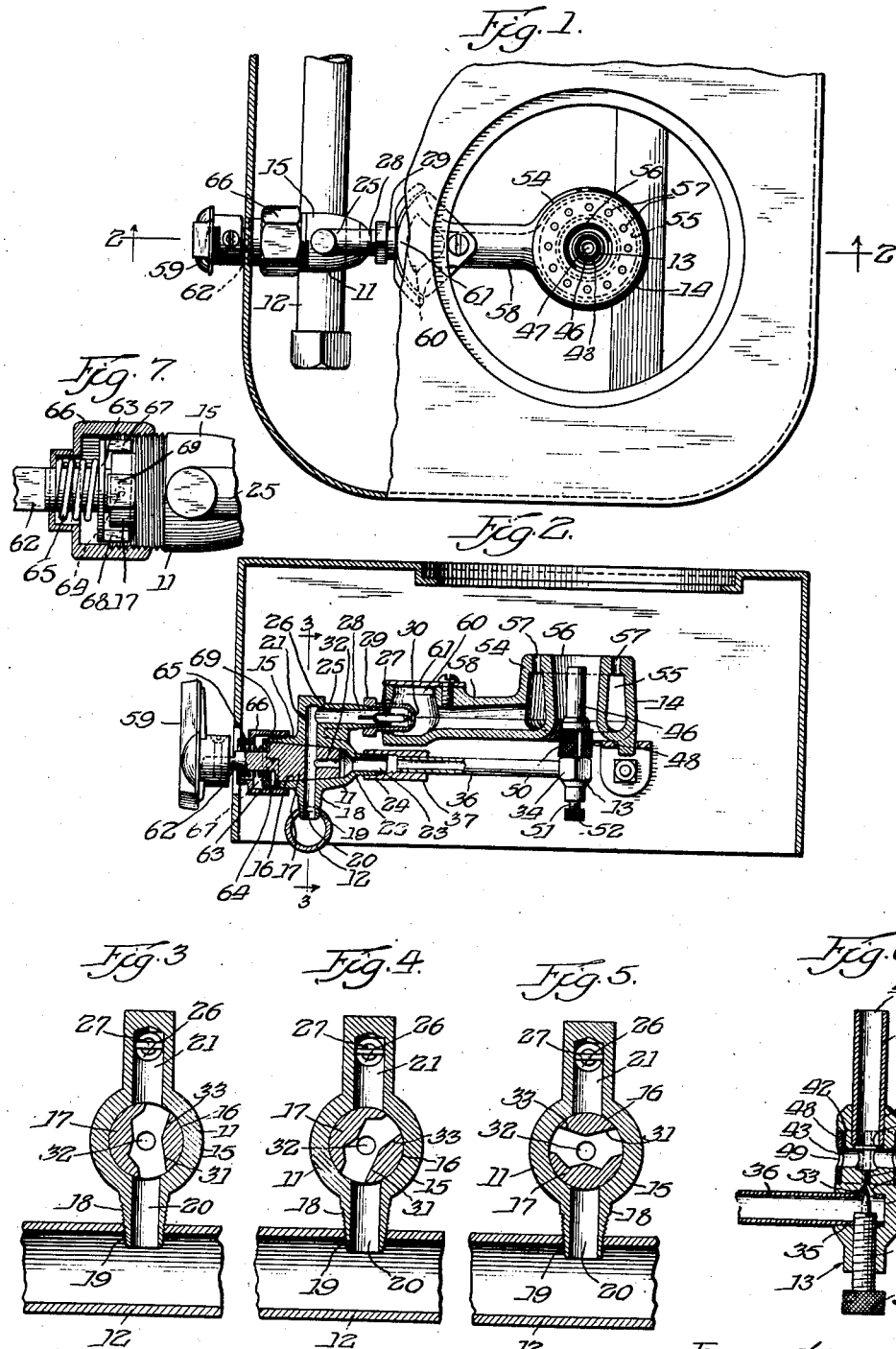
Inventor:
Philip S. Harper Patented Nov. 9, 1937

2,098,659

UNITED STATES PATENT OFFICE 2,098,659

GAS BURNER

Philip S. Harper, Chicago, Ill.

Application July 2, 1936, Serial No. 88,520

2 Claims. (Cl. 158—105)

This invention pertains to gas burners as commonly used in small stoves for brewing coffee, and consists of a burner and valve in combination having a construction particularly advantageous for brewing and warming coffee.

In lunchrooms and restaurants where coffee is served in quantity and at all hours, glass coffee brewers are widely used for the preparation of coffee. Because of the service requirements certain burner characteristics are particularly desirable. The obtainment of these characteristics under these special conditions is the particular object of the burner and valve construction disclosed.

As is well known, in a lunchroom or restaurant there are certain peak periods of operation during which the demand for food is great. An appliance for brewing coffee must be capable of fulfilling large demands during these peak periods. This means that the burner supplying heat must be large enough to make the coffee quickly. Under ordinary conditions a burner supplying about 4500 B. t. u.'s per hour is very satisfactory. The peak periods are of very short duration and during the greater part of the day coffee is less in demand but still must be in readiness for instant serving. The burner, in order to meet this lesser demand over a long period of time, must have characteristics widely differing from the peak load characteristics. The coffee must be kept warm at the proper serving temperature. At the same time, the coffee must be kept well below the boiling point. Otherwise all the valuable properties of the natural coffee are lost and the savory taste is destroyed. The burner must have a very low heating rate of about 250 B. t. u.'s per hour in order to maintain the liquid at proper temperature. Since a burner designed to deliver 4500 B. t. u.'s cannot practically be throttled down to 250 B. t. u.'s the problem is to devise a double burner using a standard double valve similar to that shown in my Patent No. 1,964,287. In this way each burner performs the particular function required of it in an efficient and satisfactory manner.

The main burner must have a much lower output than the top burner of an ordinary gas range, which usually has an output of about 9000 B. t. u.'s per hour. Thus, to be efficiently designed for the proper air-gas mixture, the burner must be very small, not over 2½" in diameter. An object of this invention is to provide a mechanical double burner construction which is compact enough to be within these dimensional limits, while at the same time operating in a safe and efficient manner.

Another object of this invention is to provide a double burner with a small central warming burner which can be located within the area of a very small central hole of an annular burner.

Another object of this invention is to provide a small double burner in which the central warming burner receives an adequate supply of secondary air.

Another object of this invention is to provide a compact double burner in which the central warming burner operates with very little heat loss at low heating rates.

A further object of this invention is to provide such a burner which may be easily assembled in the heating unit and removed for cleaning.

An object of this burner is to provide a practical double burner construction for use in small coffee brewing units.

Another object is to provide a double burner in which the parts are so disposed that combustion of the warming burner does not interfere with combustion of the main burner and vice versa.

Another object is to provide a burner for the purpose hereinbefore described in which proper air injection may be obtained in a warming burner of the low capacity required.

These and other objects of my invention will be more fully and better understood by reference to the accompanying sheet of drawings, and in which—

Figure 1 is a view showing a valve and burner assembly;

Figure 2 is a side elevation showing a partial section on line 2—2 of Figure 1;

Figure 3 is a section through the inlet gasway of the valve, on line 3—3 of Figure 2;

Figures 4 and 5 show the same section with the valve in different rotary positions;

Figure 6 is a side sectional elevation of the warming burner; and

Figure 7 is a detail view, partially in section, showing the outer end of the plug and stem.

Referring now to the drawing, a valve 11 is shown connected with a gas supply manifold 12. The valve has integrally fastened thereto a warming burner 13 and an annular main burner 14 slidably rests on the valve.

The valve consists principally of a casing 15 with a plug receiving passage 16 and a rotary plug 17 in bearing therewith. The casing has a projection 18 extending downward at right angles to the rotary axis of the plug, and this projection is threaded at point 19 for the purpose of fastening the valve to the manifold 12. Projection 18 has passage 20 drilled therein and connecting with the plug receiving passage. An extending passage 21 forms a continuation of passage 18 on the opposite side of the casing. The casing 15 has a projection 22 thereon substantially coaxial with the axis of the plug. Projection 22 is threaded at point 24 and has an outlet passage 23 therein connecting with the plug receiving passage. The casing 15 has another projection 25 spaced above projection 22 and extending in a direction substantially parallel to projection 22. Projection 25 has an outlet passage 26 therein connecting with extending passage 21. A jet 27 is pressed in outlet passage 26. Projection 25 is threaded at point 28 and an orifice cap 29 having an orifice 30 is screwed thereon. Thus the orifice cap and pin form an ordinary adjustable orifice, the free opening of which can be adjusted by tightening or loosening the orifice cap.

A transverse passage 31 is drilled through the plug with an opening on the bearing surface which registers with passage 20. A second transverse passage 33 is drilled through the plug intersecting passage 31 at an angle of approximately 150°. Passage 33 registers with extending passage 21 in the casing. A longitudinal passage 32 is drilled intersecting transverse passage 31 and opening on the bottom of the plug.

A stem 62 projects from the upper end of the plug through a sleeve 63 which is fastened to the plug by means of a pin 64. Above the sleeve the stem projects through a spring 65 and a top nut 66 which compresses the spring against the sleeve holding the plug in seated relation to the casing. The sleeve 63 has milled stops 67, and 68 which abut against a projection 69 on the valve to limit rotational movement of the plug. The plug is rotated by means of a handle 59.

The warming burner 13 has a vertically disposed body portion 34. A horizontal hole 35 is drilled in the body portion 34 and a horizontally extending tube 36 is pressed therein. At the opposite end the horizontally extending tube has a connecter 37 pressed thereon for the purpose of making a threaded connection with the axial projection 22 of the casing at point 24. A hole 38 is drilled vertically upward through the bottom surface of the body portion 34 and through the horizontally extending tube 36. The vertically directed hole 38 has at the top a tapered seat 39. At the apex of the tapered seat a very small hole 40 is drilled vertically upward into a larger substantially co-axial passage 41 which serves as a mixing passage. A transverse hole 42 is drilled through the body portion 34 intersecting mixing passage 41 and having two openings numbered 43 and 44 for admission of primary air to the mixing passage. The mixing passage 41 is enlarged at point 45 so that a short tube 46 may be pressed therein. The short tube 46 is of proper length to provide good air injection and to allow for thorough mixing of gas before ignition. The top end of the tube is open so as to form a single vertically discharging port 47. A ring shaped air shutter 48 split longitudinally springs down and around the body portion 34. The air shutter has holes 49 and 50 drilled therethrough which register with the openings 43 and 44 of transverse hole 42 in the body portion. The amount of primary air may be reduced by turning the air shutter so as to partially close the air openings.

The hole 38 through the bottom surface of the warming burner is threaded at point 51 to receive a needle screw 52. The needle screw has a point 53 which projects upward into the small vertical hole 40. The flow of gas is controlled by this needle screw and may be reduced to a very small amount while at the same time maintaining good air injection. The flow of gas may be entirely closed off by turning the needle screw until the needle seats against the tapered seat 39.

Thus far it will be seen that the valve 11 and warming burner 13 as assembled in the manifold form a rigid unit. The main burner 14 is a separate unit slidably assembled on the valve and warmer burner. The main burner 14 consists of an annular burner section 54 and a horizontal mixing tube portion 58 connecting therewith. The annular burner section 54 has a central hole 56 therethrough. The annular burner section surrounds an annular burner chamber 55 and has in its upper wall a series of ports 57 discharging from the burner chamber. The mixing tube has an opening 60 and an air shutter 61 for regulating primary air supply to the burner 14. When the annular main burner is assembled the orifice cap of the valve projects into the horizontal mixing tube 58 of the burner and the short vertical tube 46 of the warming burner extends upward through the central hole 56 of the main burner. The small tube is spaced from the annular burner section in order to allow free access of secondary air through the central hole to both the warming burner port and the main burner ports and also in order to allow for easy removal of the annular main burner.

As to operation of the valve, the passages within the plug are arranged so that gas may flow to both burners at the same time, or to the warming burner only, or the flow of gas to the burners may be cut off entirely. Figure 3 shows the plug in position to deliver gas to both burners. Gas flows from the inlet passage 20 through passages 31, 33, 21, and 26, to the main burner. Gas also flows from the inlet passage 20 through passages 31, 16, and 23 to the warming burner.

Figure 4 shows the valve in position to direct gas to the warming burner only. The handle is turned approximately 45° in a clockwise direction from the position shown in Figure 3 until the stop on the sleeve 67 abuts against the projection 69 on the casing. Passage 21 is sealed at the bearing surface so that no gas may flow to the main burner. Passage 31 partially registers with passage 20 so that gas may flow from the inlet passage 20 to the warming burner.

Figure 5 shows the plug in the fully closed position. The plug is rotated in a counterclockwise direction until stop 68 on the sleeve 63 abuts against the projection 69 on the casing. In this position of the plug the inlet gasway 20 is sealed at the bearing surface.

From the foregoing it will be seen that in the invention a very compact and efficiently operating burner is provided which is capable of furnishing under limited space conditions either a very low concentrated warming heat or an efficient fast heat.

When the warming burner is turned on a single port directs a concentrated flame centrally against the bottom of the pan. The warming burner is located within the area of a very small hole in the main burner and the construction disclosed permits of such compactness that secondary air flowing through the central hole is still available to both burners. The main burner is very small and still retains a high efficiency even though having a warming burner in the center. The main burner can be easily assembled and removed for cleaning.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. In combination, a gas valve having a single inlet and having two outlets, one above the other and substantially parallel with each other, the upper of said two outlets having a restricting orifice, a gas burner comprising an annular burner section having a central hole therethrough and a mixing tube connecting therewith, said upper outlet of said valve slidably projecting into the said mixing tube, said burner having means allowing for admission of air to said mixing tube, a tubular extension rigidly connecting with the lower of said outlet projections and extending horizontally therefrom below the mixing tube of said annular burner to a point below the central hole of said burner, said tubular extension connecting with a vertically disposed warming burner which extends upwardly within the central hole of the said annular burner section, the outer wall of said warming burner being spaced from the inner wall of said annular burner so as to allow for adequate upward flow of secondary air to both burners, said warming burner being adequately supported by said lower outlet, said gas burner being free from rigid connection with said warmer burner, said warming burner having a restricting gas discharge orifice discharging upwardly into a vertical mixing tube, the warming burner having air opening means in the vertical mixing tube above said gas discharging orifice in order to allow for admission of primary air into the warming burner.

2. In combination, a gas valve having a single inlet and having two outlets, one above the other and substantially parallel with each other, the upper of said two outlets having a restricting orifice, a gas burner comprising an annular burner section having a central hole therethrough and a mixing tube connecting therewith, said upper outlet of said valve slidably projecting into the said mixing tube, said burner having means allowing for admission of air to said mixing tube, a tubular extension rigidly connecting with the lower of said outlet projections and extending horizontally therefrom below the mixing tube of said annular burner to a point below the central hole of said burner, said tubular extension connecting with a vertically disposed warming burner which extends upwardly within the central hole of the said annular burner section, the outer wall of said warming burner being spaced from the inner wall of said annular burner so as to allow for adequate upward flow of secondary air to both burners, said warming burner being adequately supported by said lower outlet, said gas burner being free from rigid connection with said warmer burner, said warming burner having a restricting gas discharge orifice discharging upwardly into a vertical mixing tube, said warming burner having an adjustment screw substantially coaxial with the vertical mixing tube, said adjustment screw having a tapered end pointed and projecting upward into said restricting orifice so that the flow of gas may be increased or decreased by advancing or withdrawing the screw, the warming burner having air opening means in the vertical mixing tube above said gas discharging orifice in order to allow for admission of primary air to the warming burner.

PHILIP S. HARPER.